United States Patent
Ohkawa

(10) Patent No.: US 6,788,441 B1
(45) Date of Patent: Sep. 7, 2004

(54) COLOR IMAGE PROCESSING APPARATUS, IMAGE PROCESSING APPARATUS, COLOR IMAGE PROCESSING METHOD, IMAGE PROCESSING METHOD, AND A COMPUTER-READABLE RECORDING MEDIUM FOR MAKING A COMPUTER EXECUTE THE METHODS

(75) Inventor: Satoshi Ohkawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/492,116

(22) Filed: Jan. 27, 2000

(30) Foreign Application Priority Data

Jan. 28, 1999 (JO) ............................................. 11-020573
May 31, 1999 (JP) ............................................. 11-153088

(51) Int. Cl.[7] ................................................. G03F 3/08
(52) U.S. Cl. ....................... 358/520; 358/517; 358/518; 358/520; 382/162; 382/167
(58) Field of Search ................................. 358/520, 500, 358/515, 518, 1.9, 523; 382/162, 167, 166; 345/156, 626, 589, 591

(56) References Cited

U.S. PATENT DOCUMENTS

| 4,535,413 | A | * | 8/1985 | Shiota et al. ................ 382/162 |
| 4,989,080 | A | * | 1/1991 | Ito ............................... 358/520 |
| 5,204,948 | A | * | 4/1993 | Kato ............................ 358/520 |
| 5,729,360 | A | * | 3/1998 | Kita et al. .................... 358/500 |
| 5,768,403 | A | * | 6/1998 | Suzuki et al. ................ 358/2.1 |
| 5,847,692 | A | * | 12/1998 | Ono ............................. 345/601 |
| 5,867,169 | A | * | 2/1999 | Prater .......................... 345/604 |
| 5,930,385 | A | * | 7/1999 | Fujimoto et al. ............ 382/162 |
| 5,966,222 | A | * | 10/1999 | Hirata et al. ................. 358/520 |
| 5,982,990 | A | * | 11/1999 | Gondek ....................... 358/1.9 |
| 6,029,238 | A | * | 2/2000 | Furukawa ...................... 712/1 |
| 6,031,543 | A | * | 2/2000 | Miyashita et al. ........... 345/593 |
| 6,108,441 | A | * | 8/2000 | Hiratsuka et al. ........... 382/167 |
| 6,236,750 | B1 | * | 5/2001 | Garber ......................... 382/162 |
| 6,337,692 | B1 | * | 1/2002 | Rai et al. ..................... 345/594 |
| 6,434,266 | B1 | * | 8/2002 | Kanno et al. ................ 382/162 |
| 6,459,419 | B1 | * | 10/2002 | Matsubayashi .............. 345/156 |

FOREIGN PATENT DOCUMENTS

| JP | 1-114267 | | 5/1989 | |
| JP | 01-114267 | * | 5/1989 | ............ H04N/1/46 |
| JP | 1-269365 | | 10/1989 | |
| JP | 01-269365 | * | 10/1989 | ............ H04N/1/46 |

* cited by examiner

Primary Examiner—Kimberly Williams
Assistant Examiner—Tia Carter
(74) Attorney, Agent, or Firm—Oblon, Spivak, McClelland, Maier & Neustadt, P.C.

(57) ABSTRACT

A color image processing apparatus comprises a plane signal conversion section which converts a color space expressed by an input color signal image to a plane and generates a plane signal; a chroma identification section which identifies a chroma of the color image based on the generated plane signal and generates a chroma identification signal; a hue area identification section which identifies a hue area in the color image signal based on the generated plane signal and generates a hue area identification signal; and a color conversion section which executes color conversion of the color image signal based on the generated chroma identification signal and the hue area identification signal.

2 Claims, 18 Drawing Sheets

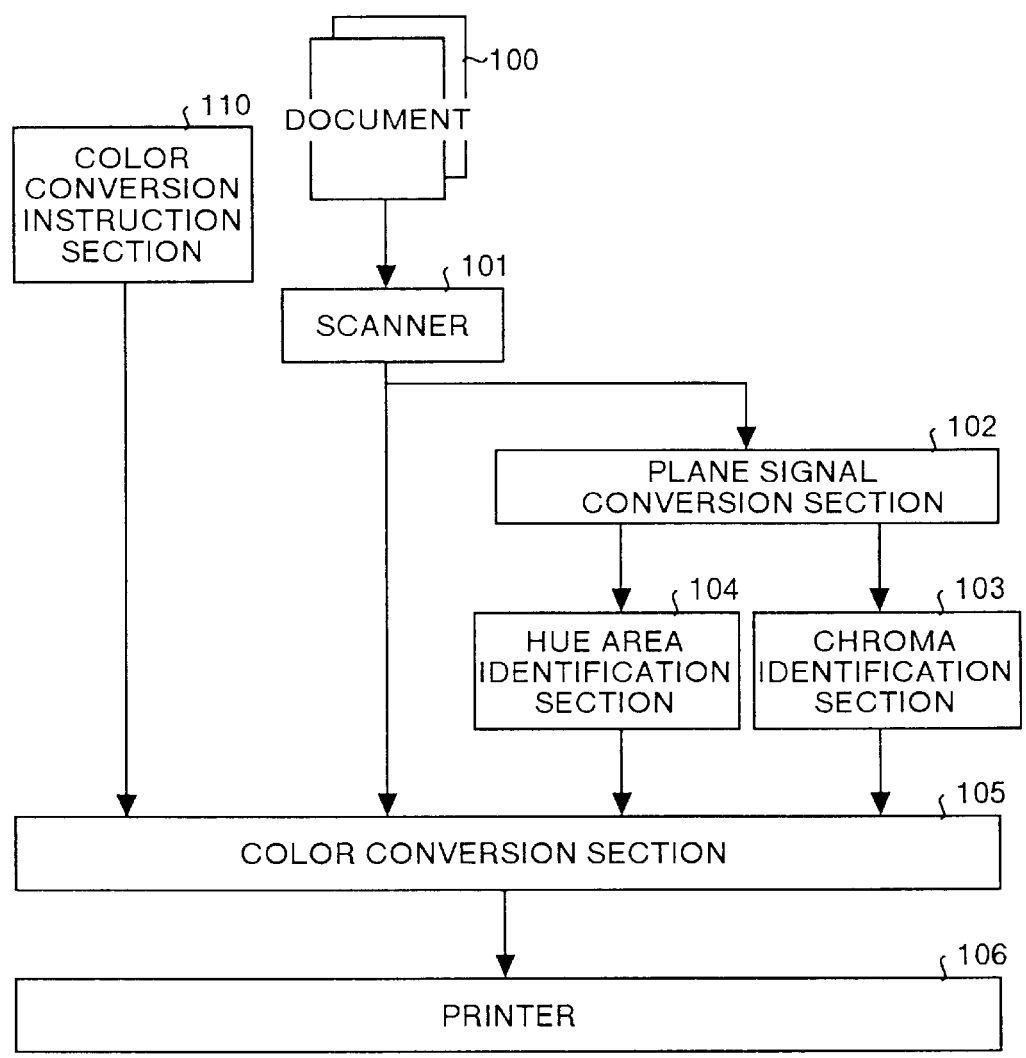

US 6,788,441 B1

COLOR IMAGE PROCESSING APPARATUS, IMAGE PROCESSING APPARATUS, COLOR IMAGE PROCESSING METHOD, IMAGE PROCESSING METHOD, AND A COMPUTER-READABLE RECORDING MEDIUM FOR MAKING A COMPUTER EXECUTE THE METHODS

FIELD OF THE INVENTION

The present invention relates to a color image processing apparatus, a color image processing method, an image processing method each making it possible to intentionally convert a color within a color image to an arbitrary color or to convert a specified color to another specified color, and a computer-readable recording medium in which a program for making a computer execute the methods is recorded.

BACKGROUND OF THE INVENTION

An apparatus for extracting a hue area, has been proposed, for instance, in Japanese Patent Laid-Open Publication No. HEI 1-114267. According to the technology described in this publication, the hue detection device detects a hue by executing multiplication in response to one having the largest amplitude among a plurality of digital color image signals (R, G, B) and using the image signal having been subjected to the processing for multiplication.

A color image processing apparatus has been proposed also in Japanese Patent Laid-Open Publication No. HEI 1-269365. This color image processing apparatus enables color conversion by determining a hue area to which a color indicated by an image signal belongs, selecting a set of prespecified parameters according to the determined area, and processing the image signal based on the selected parameters.

In the hue detection device as disclosed in Japanese Patent Laid-Open Publication No. HEI 1-114267 and the color image processing apparatus as disclosed in Japanese Patent Laid-Open Publication No. HEI 1-269365, when a hue is detected, a hue area is separated from other areas with a straight line. Namely, a flat and straight plane passing through the origin of the color space is assumed as the border, whether the color has a hue for a specific color or not is detected depending upon on which side of the border a hue of the color is present.

However, in reality, the hue fluctuation in color is in a curved form as shown in the hue fluctuation characteristics (color chart) in FIG. 18. Letters a and b in FIG. 18 indicate axes each indicating density of a specific color in the color chart when the image is read. Because of such characteristics, there is a disadvantage that, when an operator tries to convert a color to a particular color, namely for instance from red to cyan, sometimes the color conversion is not executed in the manner the operator desires.

As understood from the hue fluctuation characteristics shown in FIG. 18, this phenomenon occurs because the hue fluctuation for red in a CMY image from a thin chroma to a dense chroma is not linear.

There is also known also a device which makes it possible to changeably set a hue area to realize the hue conversion in the manner desired by an operator. However, when a hue area is changeably set, the required circuit scale becomes disadvantageously large.

SUMMARY OF THE INVENTION

It is an object of the present invention to provide a color image processing apparatus, an image processing apparatus, a color image processing method, an image processing method, each of which makes it possible for an operator to carry out color conversion as the operator desired when a specified color is converted to another specified color, and also to provide a computer-readable recording medium in which a program for making a computer execute the methods is recorded.

In the color image processing apparatus according to one aspect of this invention, a plane signal conversion unit generates a plane signal by converting a color space expressed by an input color image signal to a plane; a chroma identification unit identifies a chroma of the color image signal based on the plane signal generated by said plane signal conversion unit and generates a chroma identification signal; a hue area identification unit identifies a hue area in the color image signal based on the plane signal generated by said plane signal conversion unit and generates a hue area identification signal, and a color conversion unit executes color conversion or the color image signal based on the chrome identification signal generated by said chroma identification signal and the hue area identification signal generated by said hue area identification unit. Thus, a color within a color image can intentionally be converted to an arbitrary color, even when chroma varies in the color images.

Other objects and features of this invention will become apparent from the following description with reference to the accompanying drawings.

BRIEF DESCRIPTION OF THE DRAWINGS

FIG. 1 is a block diagram showing functional configuration of a color image processing apparatus according to a first embodiment of the present invention;

DESCRIPTION OF THE PREFERRED EMBODIMENTS

Figure 2A:
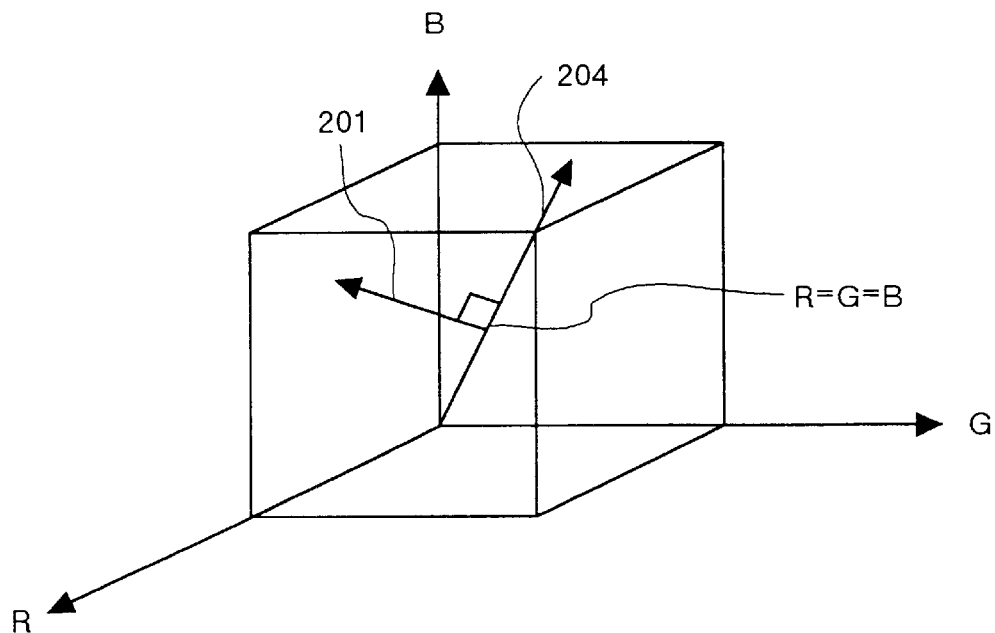
FIG. 2A and FIG. 2B are color space graphs for a color image signal expressed with three axes indicating reading densities for R,G, and B respectively.

Preferred embodiments of a color image processing apparatus, a color image processing method, and a computer-readable recording medium with a program for making a computer execute the method recorded therein.

The color image processing apparatus according to the first embodiment of the present invention is a color image processing apparatus, with which an operator can freely convert, even when an input device having different characteristics such as a scanner is used, any color specified by an operator to another color.

To begin with, an outline of the color image processing apparatus according to the first embodiment is explained. FIG. 1 is a block diagram showing a functional configuration of the color image processing apparatus according to the first embodiment of the present invention. As shown in FIG. 1, the color image processing apparatus comprises a scanner 101, a plane signal conversion section 102, a chroma identification section 103, a hue area identification section 104, a color conversion section 105, and a printer 106.

The scanner 101 reads an image of a document 100. The plane signal conversion section 102 converts a color space expressed by the color image signal input from the scanner 101 to a plane and generates a plane signal.

The chroma identification section identifies a chroma of the color image signal based on the plane signal generated by the plane signal conversion signal 102, and generates a chroma identification signal. The hue area identification section 104 identifies a hue area in the color image signal based on the plane signal generated by the plane signal conversion section 102, and generates a hue area identification signal.

The color conversion section 105 subjects a color image signal to color conversion based on the chroma identification signal generated by the chroma identification section 103 and the hue area identification signal generated by the hue area identification section 104. The printer 106 prints an image based on the color image signal from the color conversion section 105.

A color conversion instruction section 110 instructs the conversion from a predetermined color to a color specified by the operator. The color conversion section 105 executes color conversion for the color image signal based on the color indicated by the color conversion instruction section 110.

Operations of the color processing apparatus are described below. At first, the document 100 is placed on a scanner 101 to read an image of the document, and the image is converted to an image signal. The image signal output by the scanner 101 is converted to a plane signal by the plane signal conversion section 102.

Figure 2B:
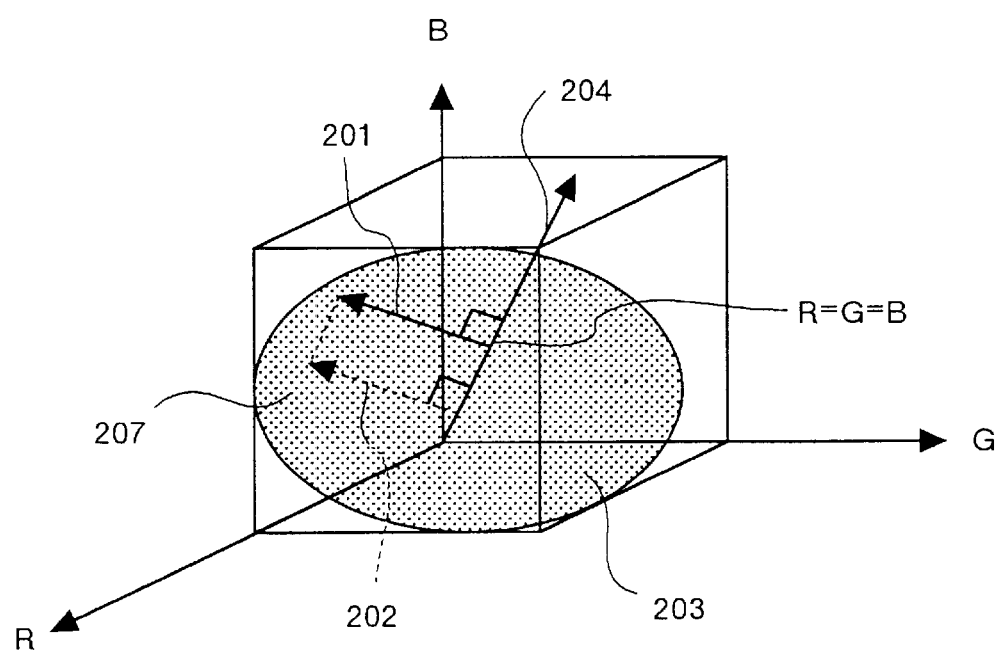

Contents of the plane signal is described below. FIG. 2A and FIG. 2B are a color space graphs for a color image signal expressed with three axes of reading densities for R, G, and B. As can be seen from FIG. 2B, a plane signal can be identified with a direction 201 from the straight line of R=G=B. The plane signal is then converted, keeping the relation in the direction 202 as it is, to a plane 202 including an achromatic color as the origin. FIG. 2B shows the plane 202.

A chroma is identified by the chroma identification section 103 based on the signal output by the plane signal conversion section 102. The hue area identification section 104 also identifies an arbitrary hue area based on the signal output by the plane signal conversion section 102.

Color conversion is executed in the color conversion section 105 based on the signal output by the chroma identification section 103, signal output by the hue area identification section 104, and image signal obtained from the scanner 101. An image output device such as the printer 106 forms a color image the image signal output by the image output device and prints the color image based on the color image.

Figure 3:
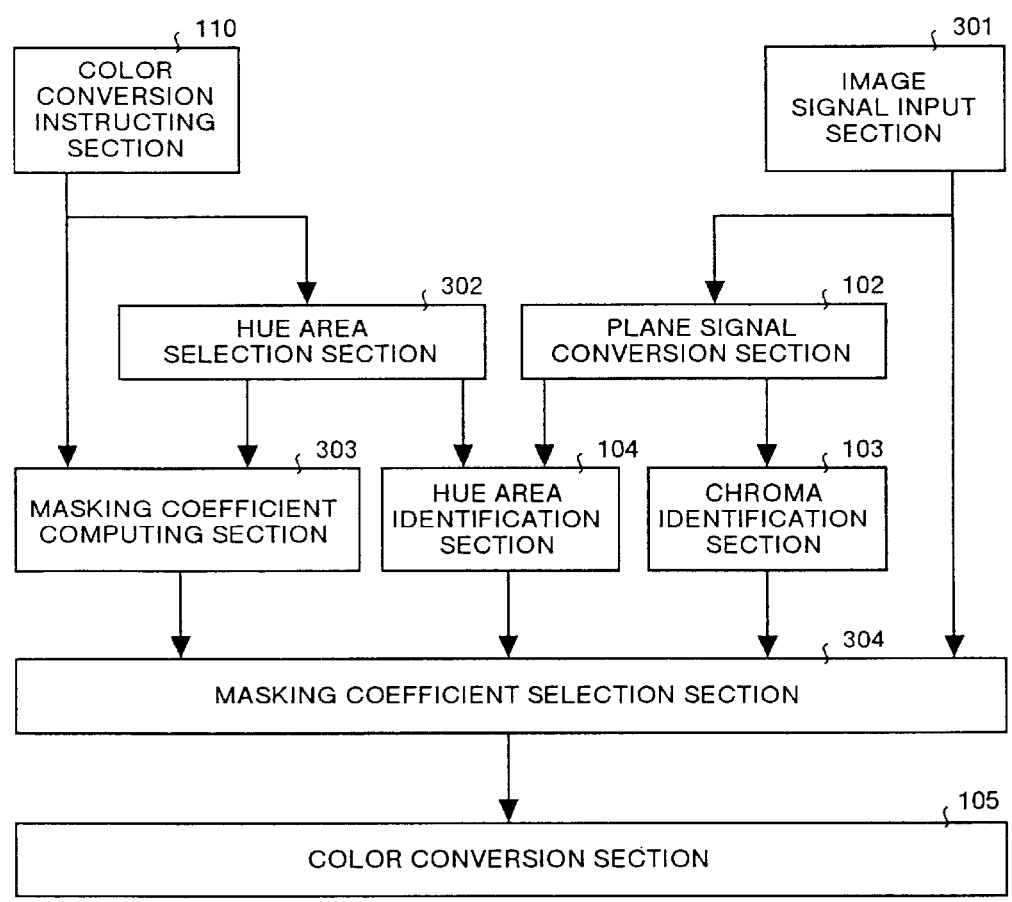
FIG. 3 is a block diagram showing more detailed functional configuration of the color image processing apparatus according to the first embodiment.

The color conversion is explained in more detail below. FIG. 3 is a block diagram showing more detailed configuration of the color image processing apparatus according to the first embodiment of the present invention. The same reference numerals are assigned to the same components as those in the color image processing apparatus shown in FIG. 1, and their explanation is omitted.

As shown in FIG. 3, the color image processing apparatus comprises a plane signal conversion section 102, a chroma identification section 103, a hue area conversion section 104, a color conversion section 105, a color conversion instructing section 110. Further, the color image processing apparatus comprises an image signal input section 301, a hue area selection section 302, a masking coefficient computing section 303, and a masking coefficient selection section 304.

The image signal input section 301 inputs an image signal. The image signal input section 301 includes the scanner 101, and further can input an image signal by means of communications of the like.

The hue area selection section 302 selects a hue area in a color image signal. Further, the masking coefficient computing section 303 computes the masking coefficients for a plurality of hue areas. The plurality of hue areas may previously be prepared, or may be selected by the hue area selection area 302.

The masking coefficient selection section 304 selects a masking coefficient based on the masking coefficient computer by the masking coefficient computing section 303, chroma identification signal generated by the chroma identification section 103, and hue area identification signal generated by the hue area identification section 104.

The color conversion section 105 executes color conversion for the color image signal using the masking coefficient selected by the masking coefficient selection unit 304.

The hue area selection section 302 selects a hue area in the color image signal based on the color specified by the color conversion instruction section 110.

Figure 4:
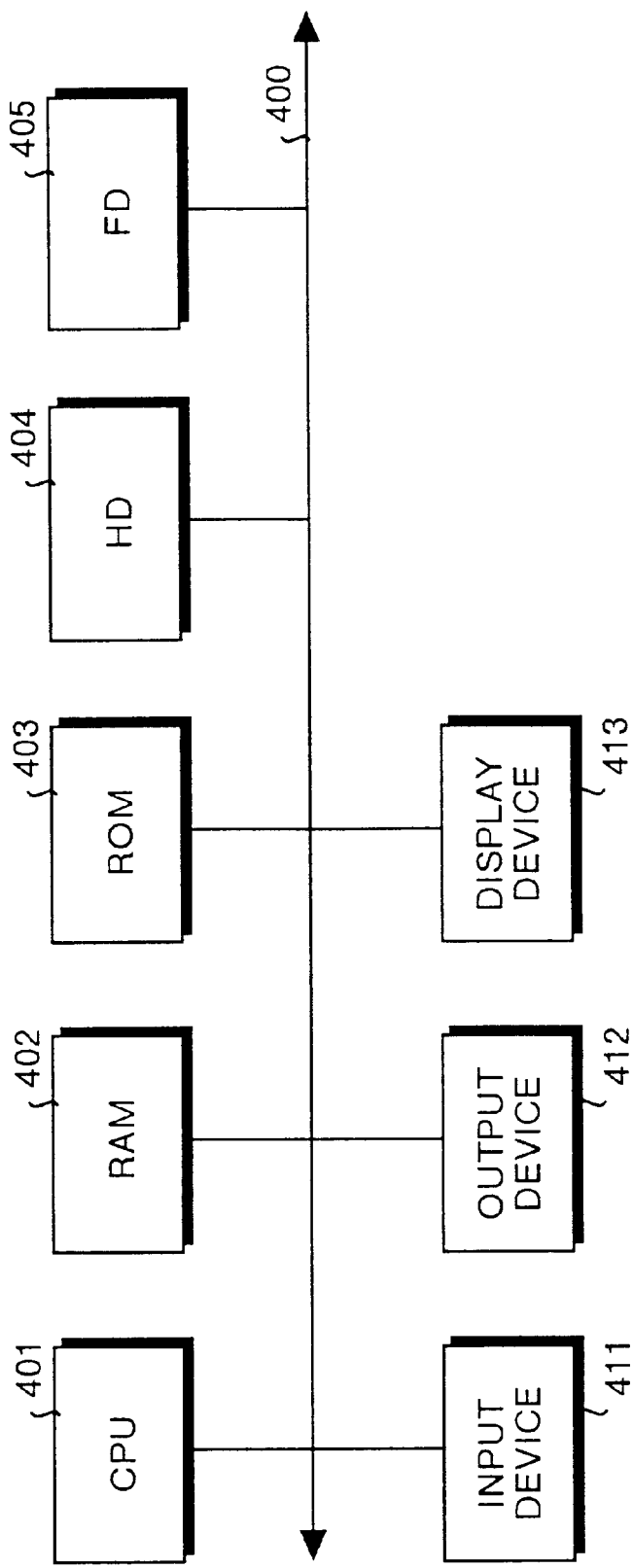
FIG. 4 is a block diagram showing hardware configuration of the color image processing apparatus according to the first embodiment.

The scanner section 101, plane signal conversion section 102, chroma identification section 103, hue area conversion section 104, color conversion section 105, printer section 106, color conversion instruction section 110, image signal input section 301, hue area selection section 302, masking coefficient computing section 303, and masking coefficient selection section 304 realize functions of the respective sections when the CPU (Central Processing Unit) 401 or other related sections execute commands described in a program recorded in a recording medium such as a ROM 403, a RAM 402, a hard disk (HD) 404, or a detachable memory such as a floppy disk (FD) 405 as shown in the block diagram in FIG. 4.

In FIG. 4, the components (CPU 401, RAM 402, ROM 403, HD 404, FD 405) are connected to each other with a bus 400. Further, an input device 411 for inputting data, an output device 412 for outputting data, and a display device 413 for displaying data are connected to the bus 400.

Operations for color conversion executed by the color image processing apparatus are explained below. At first, an instruction for converting a color to an other color is issued by the color conversion instruction section 110. The data concerning such an instruction is sent to the hue area selection section 302.

Figure 5:
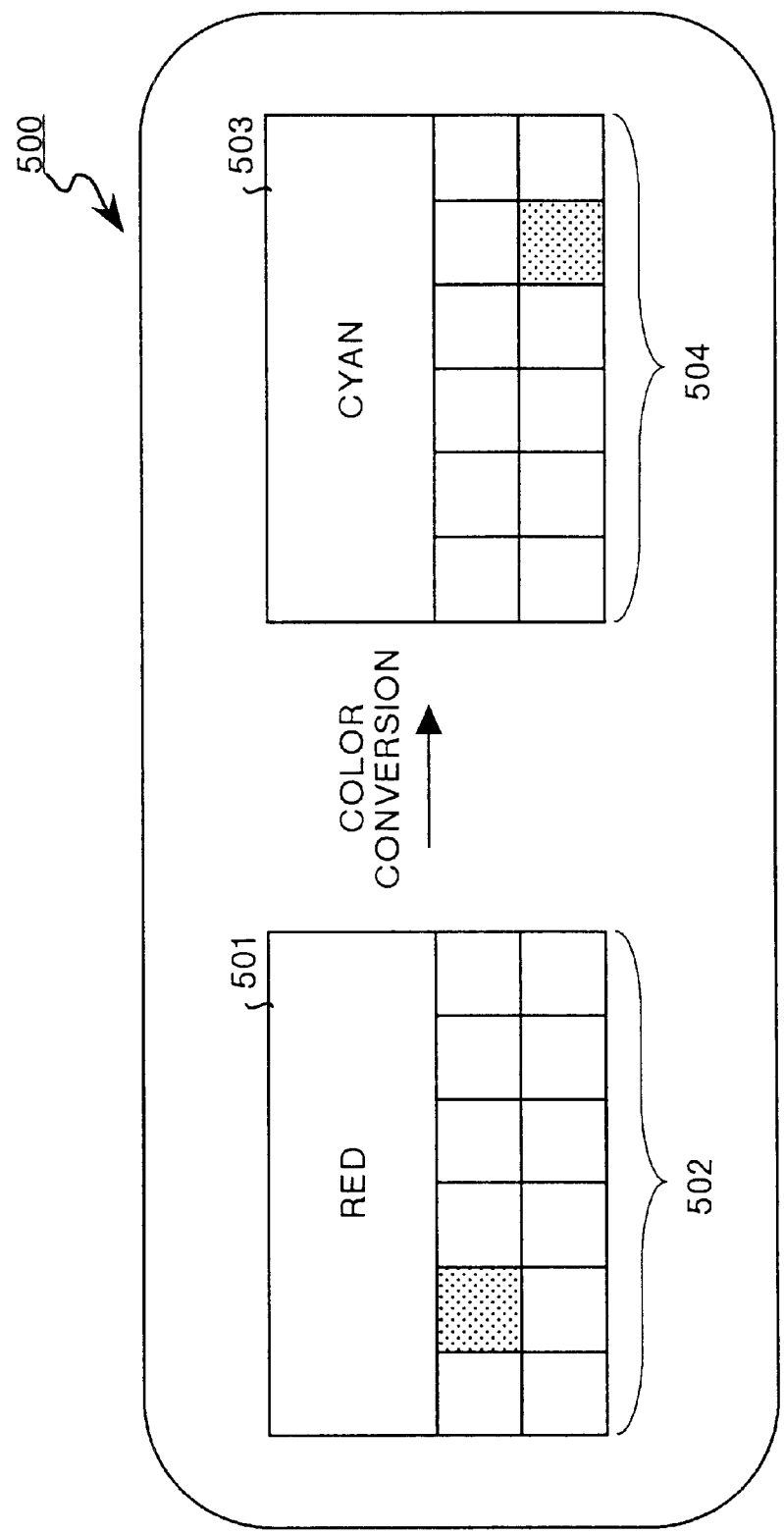
FIG. 5 shows an example of an operation panel for instructing color conversion in the color image processing apparatus according to the first embodiment.

FIG. 5 shows one example of an operation panel 500 for instructing color conversion in the color image processing apparatus according to the first embodiment. As shown in FIG. 5, the operation panel 500 comprises a first display column 501 which displays color data as an object to be converted, a first select button group 502 for selecting a color as an object to be converted, a second display column 503 which displays color data after color conversion, and a second select button group 504 which selects a color as an object to be converted.

The first and second select button groups are set in such a manner that the groups corresponds to colors as objects to be converted, and data (e.g., name) of a color is displayed on a corresponding button, or the button itself is displayed with the corresponding color.

The operator specifies a color to be converted. The color is specified by pressing a button corresponding to the color to be converted from the first select button group 502 on the operation panel 500.

In FIG. 5, a second button from the left in the upper column is selected from the first select button group 502 to specify "red" which is a color corresponding to the button, and the characters of "red" indicating the color name are displayed on the first display column 501, and with this operation, selection is complete.

A color after conversion is also specified in the same manner. Namely, a desired color is specified with the second select button 503. When a second button from the right in the lower column is pressed from the second select button group 504, the characters of "cyan" are displayed on the second display column 503, and with this operation, selection is complete.

The hue area selection section 302 prepares several hue areas based on the data specified through the operation of the operation panel.

Figure 6:
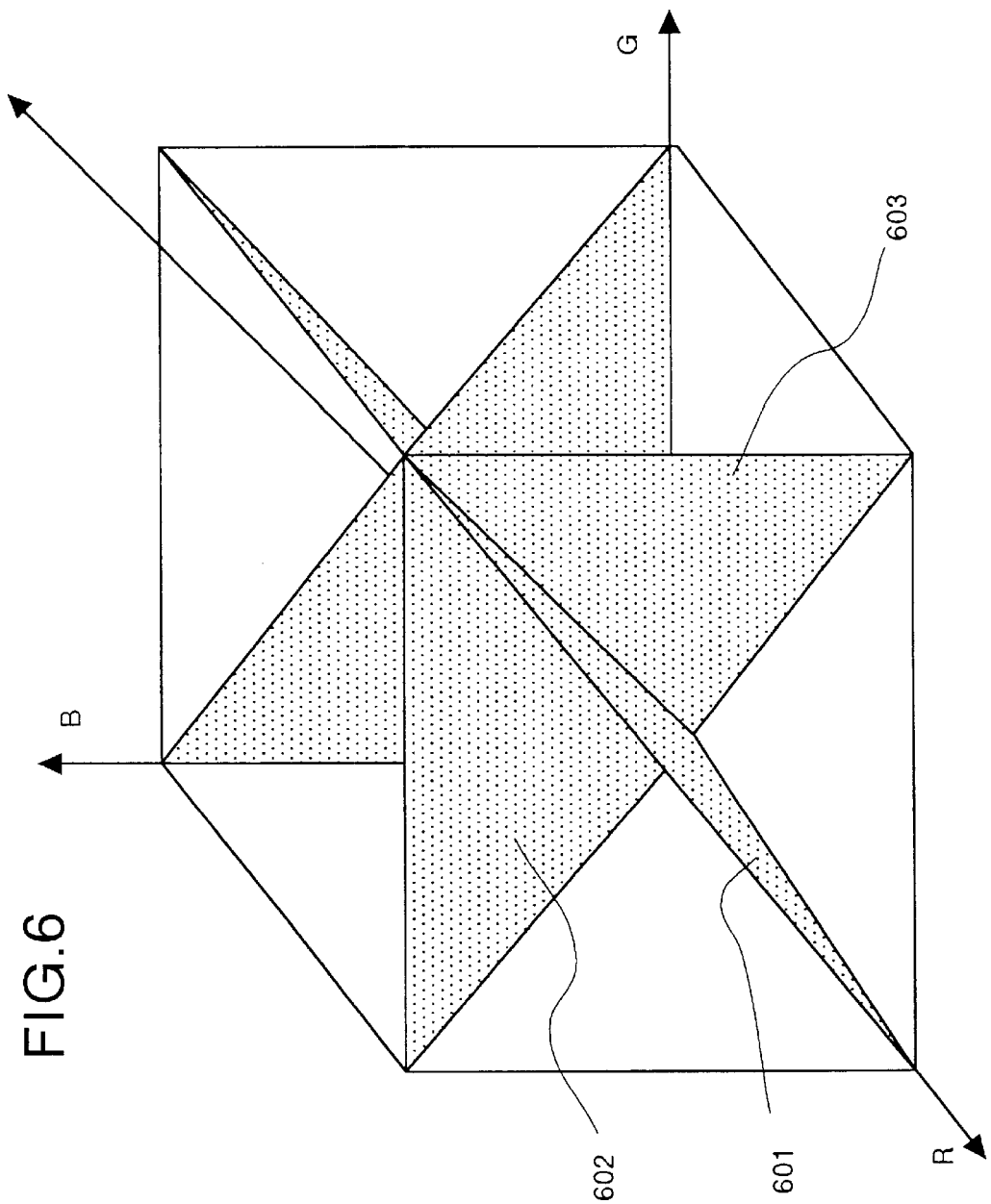
FIG. 6 shows another color space graph for a color image signal expressed with three axes of reading densities for R,G, and B.
Figure 7:
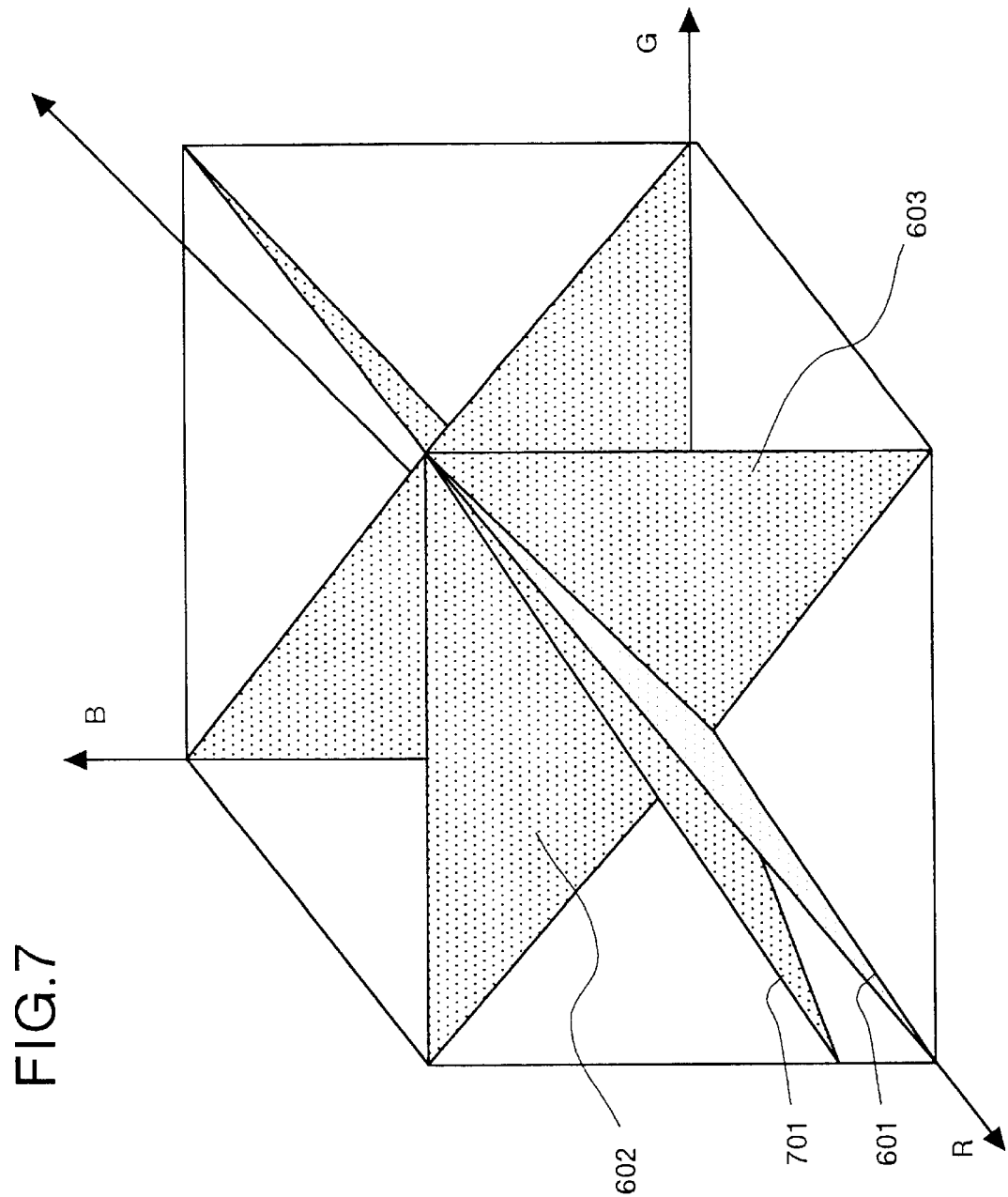
FIG. 7 shows another color space graph for a color image signal expressed with three axes of reading densities for R,G, and B.

FIG. 6 and FIG. 7 show another color space graph for a color image signal expressed with three axes of R, G, and B. In the following explanation, it is assumed that the hue areas as shown in FIG. 6 have been already prepared. In this figure, areas separated from each other by the borders 601, 602, 603 are hue areas.

However, when the borders are set in this manner and an instruction for color conversion is issued, if a chroma for R is high, a color desired by the operator can not be obtained. Therefor, in addition to the border 601, another border 701 is provided as shown in FIG. 7.

The hue area identification section 104 identifies the hue area of the image signal input by the image signal input section 301 based on the hue areas set in the hue area selection section 302. The chroma identification section 103 identifies the chroma of the input image signal.

In the masking coefficient computing section 303, a masking coefficient for each of the hue areas is computed based on data specified in the color conversion instruction section 110. The masking coefficient computing section 303 computes a coefficient for each hue area so that a color specified in the color conversion instruction section 110 or the like is converted to another color. Each area is any of hue areas prepared at first, and the area is separated by a border from other ones as shown in FIG. 6.

In the masking coefficient selection section 304, an optical masking coefficient is selected based on masking coefficients for a plurality of hue areas computed in the masking coefficient computing section 303, a chroma identification signal generated by the chroma identification section 103, and a hue area identification signal generated by the hue area identification section 104.

In the masking coefficient selection section 304, when it is identified by the hue area identification section 104, for instance, that a hue area is between the border 601 and border 701 in FIG. 7, the chroma identification signal generated in the chroma identification section 103 is referred to. When it is identified that the chroma is low, a masking coefficient for an area between the border 601 and border 602 in FIG. 6 is selected for the hue area.

When it is identified by referring to the chroma identification signal generated in the chroma identification section 103 that the chroma is low, a value for the area separated by the border 601 and border 603 is used for the masking coefficient.

As described above, a coefficient for an identified hue area is not used, and a coefficient for area in which the color conversion is to be executed is used.

The image signal input from the image signal input section 301 is subjected to color conversion by the color conversion section 105 based on the result of selection by the masking coefficient selection section 304.

Figure 8:
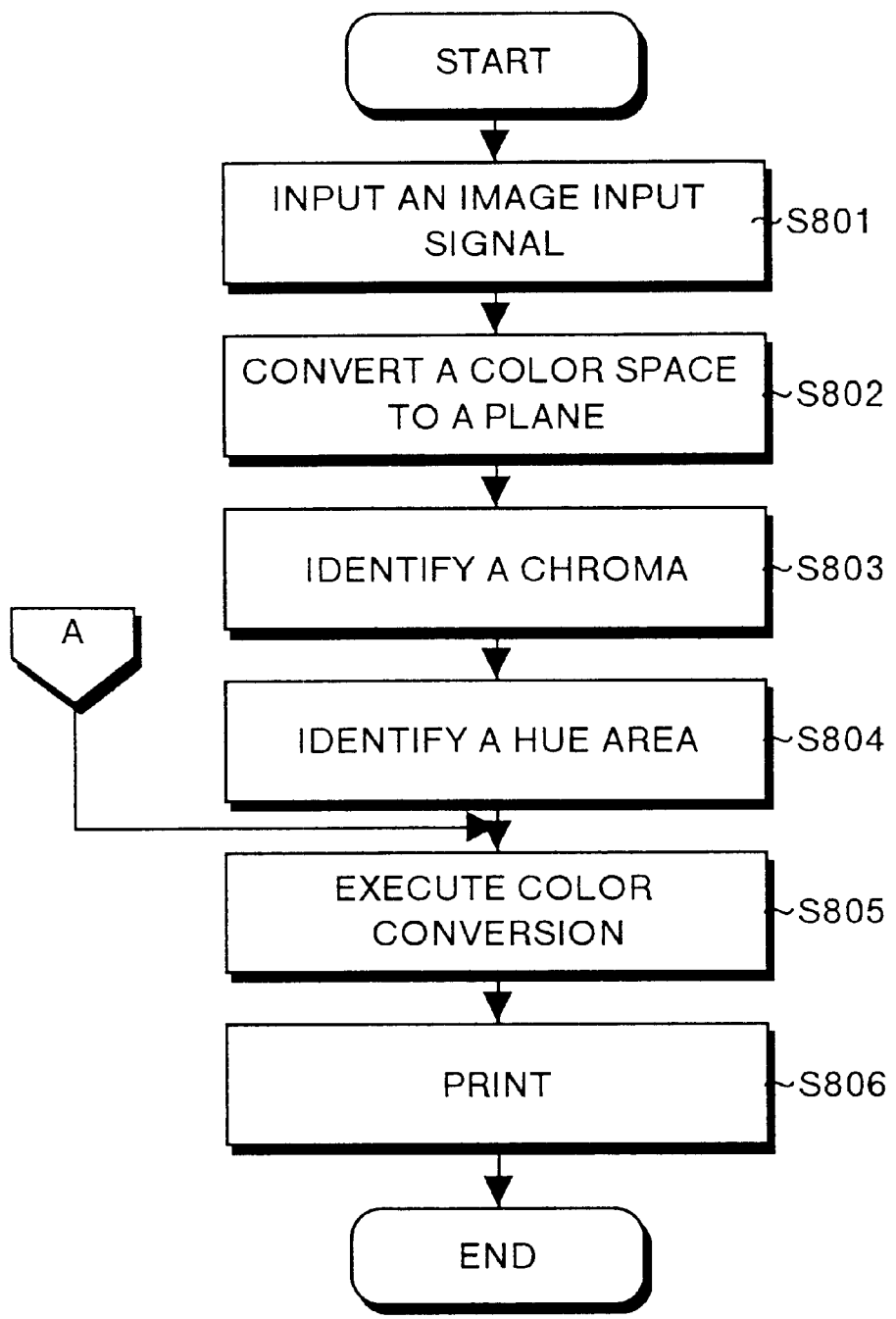
FIG. 8 is a flow chart showing a series of processing executed by the color image processing apparatus according to the first embodiment.

Contents of a series of operations executed by the color image processing apparatus according to the first embodiment is described below. FIG. 8 is a flow chart showing a series of processing executed by the color image processing apparatus according to the first embodiment. In the flow chart shown in FIG. 8, at first a color image signal is input (step S801), a color space for the input color image signal is converted to a plane, and a plane signal is generated (step S802).

A chroma of the color image signal is identified based on the plane signal generated at step S802, and a chroma identification signal is generated (step S803). Similarly, a hue area in the color image signal is identified based on the plane signal generated at step S802, and a hue area identification signal is generated (step S804).

Color conversion for the color image signal is then executed based on the chroma identification signal generated at step S803 and the hue area identification signal generated at step 804 (step S805).

The image is printed out based on the color image signal subjected to color conversion at step S805 (step S806), and the processing sequence is finished.

Figure 9:
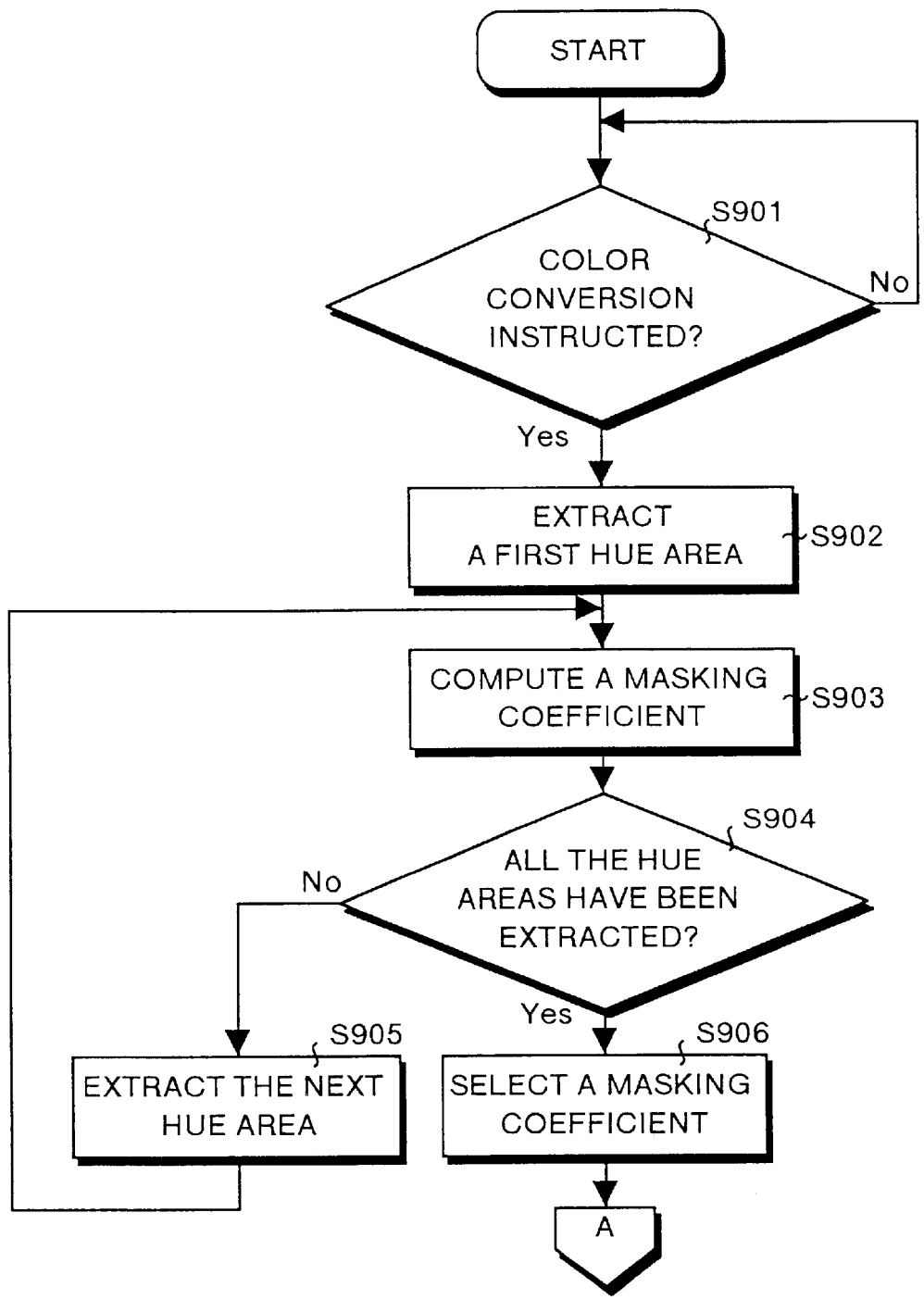
FIG. 9 is a flow chart showing a series of processing selection of a masking coefficient executed by the color image processing apparatus according to the first embodiment.

FIG. 9 is a flow chart showing a series of processing till the selection of a masking coefficient in the color processing apparatus according to the first embodiment. In the flow chart in FIG. 9, at first whether an instruction for color conversion has been issued or not is determined (step S901). When it is determined that an instruction for color conversion has not been issued, an instruction for color conversion is waited, and when the instruction has been issued (step S901, yes), a first hue area is extracted from a plurality of hue areas (step S902), and a masking coefficient for the extracted hue area is computed (step S903).

At step S904, whether all of the hue areas have been extracted or not is determined. When it is determined that all of the hue areas have not been extracted (step S904,no), next hue area is extracted (step S905). Then the processing at step S903 is executed again, and the processing sequence from step S903 to S905 is repeated.

When it is determined at step S904 that all of the hue areas have been extracted (step S904, yes), a masking coefficient is selected from the masking coefficients computed at step S903 based on the chroma identification signal and the hue area identification signal (step S906).

The processing of step S805 in FIG. 8 is then executed, and color conversion is executed by using the masking coefficient selected at step S906 (step S805).

As described above, with the color image processing apparatus according to the first embodiment, even in a case of an image having a different chroma, a color in the color image can be converted to a color specified by the operator. Further, an optimal masking coefficient can be selected when color conversion is to be executed based on color specification according to the operator.

Figure 10:
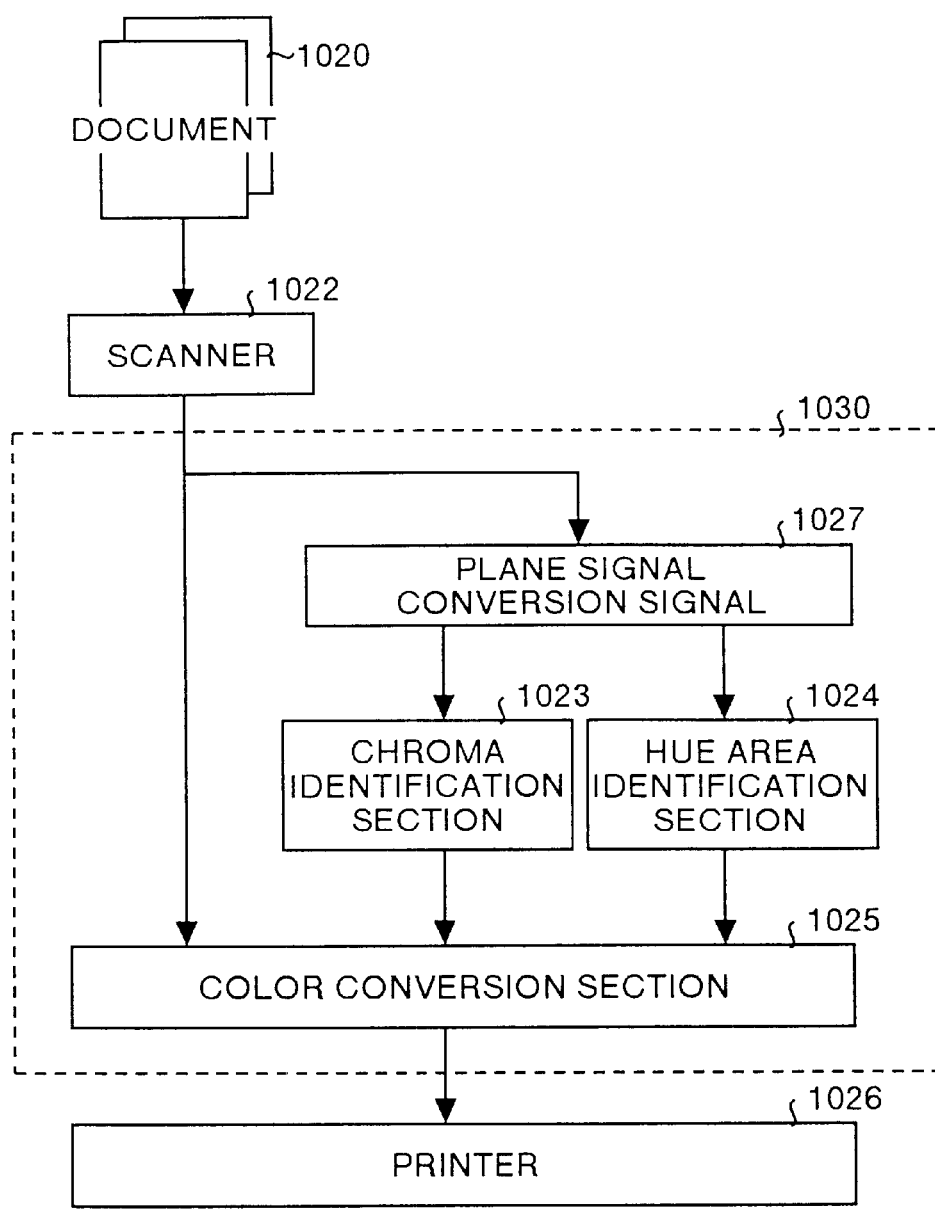
FIG. 10 is a block diagram showing functional configuration of an image processing apparatus according to a second embodiment of the present invention.

Contents of an image processing apparatus according to a second embodiment of the present invention is described below. FIG. 10 is a block diagram showing general configuration of the image processing apparatus according to the second embodiment. A color image is drawn or printed on a document 1021. A scanner 1022 converts a particular color in the image on the document 1021 to another color and outputs the converted image signal. A printer 1026 prints an image based on the image signal output by a conversion section 1030.

A plane signal conversion section 1027 in the conversion section 1030 converts the image signal (on a color space) output by the scanner 1022 to a plane signal. This plane signal conversion section 1027 identifies an image signal on a color space in a direction 201 orthogonal to the straight line 204 on which R=G=B in the example of color space shown in FIG. 2A. The color space shown in FIG. 2A is a space expressed with three axes (R axis, G axis, and B axis) indicating the densities for three colors of R, G, and B read from the document.

FIG. 2B shows a situation in which an image signal on a color space is identified with reference to the direction 201. The image signal on a color space is converted, without losing the relation against the direction 201, to a plane signal 202 on a plane 207 assuming an achromatic color as the origin. A plane 203 crosses a straight line 204 at right angles.

A chroma identification section 1023 identifies a chroma based on the signal output by the plane signal conversion section 1027. In this step, conversion is executed so that the origin of the plane 203 is an achromatic color, so that a chroma can be identified by checking a distance from the origin (achromatic color).

Figure 11:
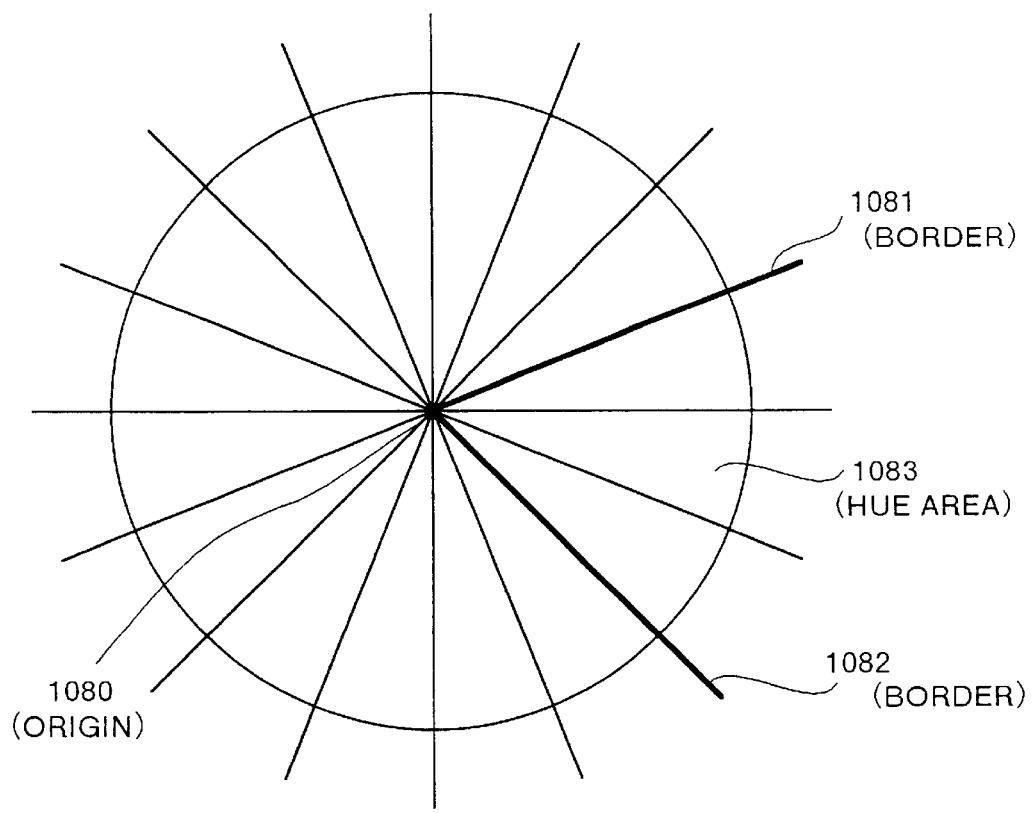
FIG. 11 shows a border line passing through the origin.

A hue area identification section 1024 identifies a hue area in an image signal with a given hue area set therein based on the signal output by the plane signal conversion section 1027. This hue area identification section 1024 selects some border lines from a plurality of border lines each passing through an original point 1080 as shown in FIG. 3, for instance, a border 1081 and a border 1082 in FIG. 11, and identifies an area surrounded by the border 1081 and border 1082 as a hue area. The hue area identification section 1924 identifies a plurality of hue areas 1083 and identifies a hue of an image signal by determining in which hue area 1083 the image signal is positioned on the plane 203.

The color conversion section 1025 executes color conversion based on the signal output by the chroma identification section 1023, signal output by the hue area identification section 1024, and image signal from the scanner section 1022, and outputs the signal to the printer 1026.

Figure 12:
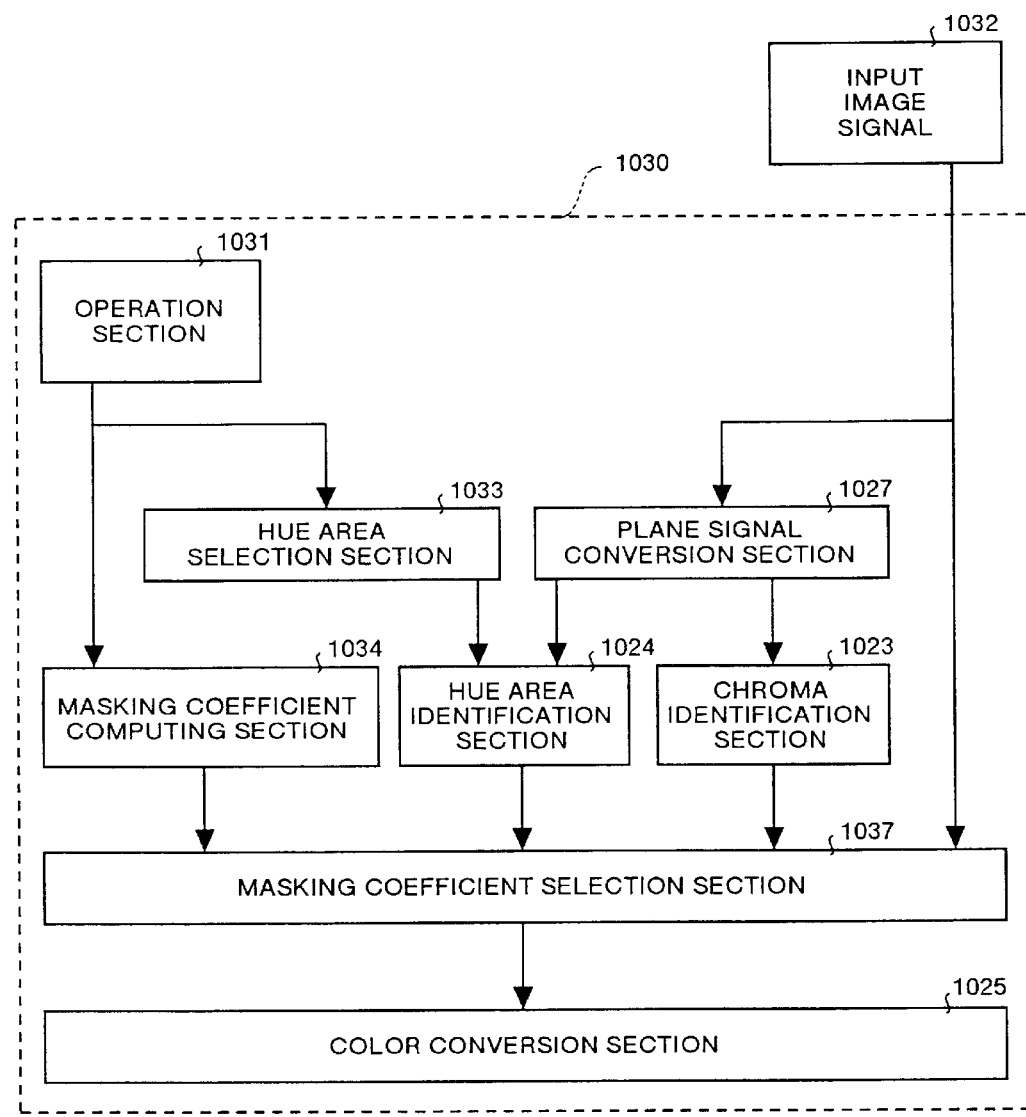
FIG. 12 is a block diagram showing more detailed functional configuration of the image processing apparatus according to the second embodiment.

Processing for color conversion in the second embodiment is explained below in more detail with reference to FIG. 12. FIG. 12 is a block diagram showing a conversion section 1030 in the image processing apparatus shown in FIG. 10 in more detail. At first, an instruction for converting a particular color specified by an operator to another particular color is input through an operation section 1031 provided with the image processing apparatus. The input data is sent to a color area selection section 1033. With the operation section 1031, an operator can input an instruction for color conversion, for instance, from red to cyan as shown in FIG. 5.

Several hue areas are prepared as shown in FIG. 5 in the color area selection section 1033 shown in FIG. 12 based on the input data specified from the operation section 1031. The prepared hue areas are shown on a color space, for instance, as shown in FIG. 6. However, a border 601 shown in FIG. 6 indicates a case where specification as shown in FIG. 5 is executed with the operation section 1041, and when a chroma for R is high, color conversion can not be executed as desired by the operator.

So in a hue area expressed on a color space, a border of the hue area is changed from the border 6 in FIG. 6 to a border 701 in FIG. 7. Switching of a hue area is executed on the plane 203. Change of a border on the plane 203 can be carried out by selecting an arbitrary one among a plurality of hue areas 1083 in the hue area identification section 24.

The hue area identification 1024 identifies a hue area of an input image signal 1032 in a hue area set by the hue area selection section 1033. The chroma identification section 1023 identifies a chroma of the input image signal 1032. A masking coefficient computing section 1034 computes a masking coefficient in each hue area so that a particular color specified with the operation section 1031 to another particular color.

In this step, computing is executed excluding only the hue areas prepared in the initial stage. For instance, in the example shown in FIG. 6, masking coefficients for areas separated from each other with the borders 601, 602, 603 or the like shown in FIG. 6 are computed.

A masking coefficient selection section 1037 selects a masking coefficient for an input image signal based on signals input from the masking coefficient computing section 1034, hue area identification section 1024, and chroma identification section 23. For instance, when it is determined in the hue area identification section 1024 that a hue of an input image signal is between the border 601 and border 701 in FIG. 7, a signal output by the chroma identification section 1023 is referred to.

When it is determined that a chroma for the signal output from the chroma identification section 1023 is low, a masking coefficient for the area between the border 601 and border 602 is selected as a hue area for the input image signal.

When it is determined that a chroma for the signal output by the chroma identification section 1023 is high, a value for the area between the border 601 and border 603 is used as the masking coefficient. As described above, a coefficient for a hue area specified by the hue area identification section 1024 is not used, and a coefficient for an area in which color conversion is to be executed is used according to a chroma of an input image signal.

The color conversion section 1025 executes color conversion for the input image signal 1032 based on a result of selection by the masking coefficient selection section 1037. Thus conversion of a hue as desired by an operator can be executed by making a method of setting a hue area variable and without making a circuit scale larger.

Figure 13:
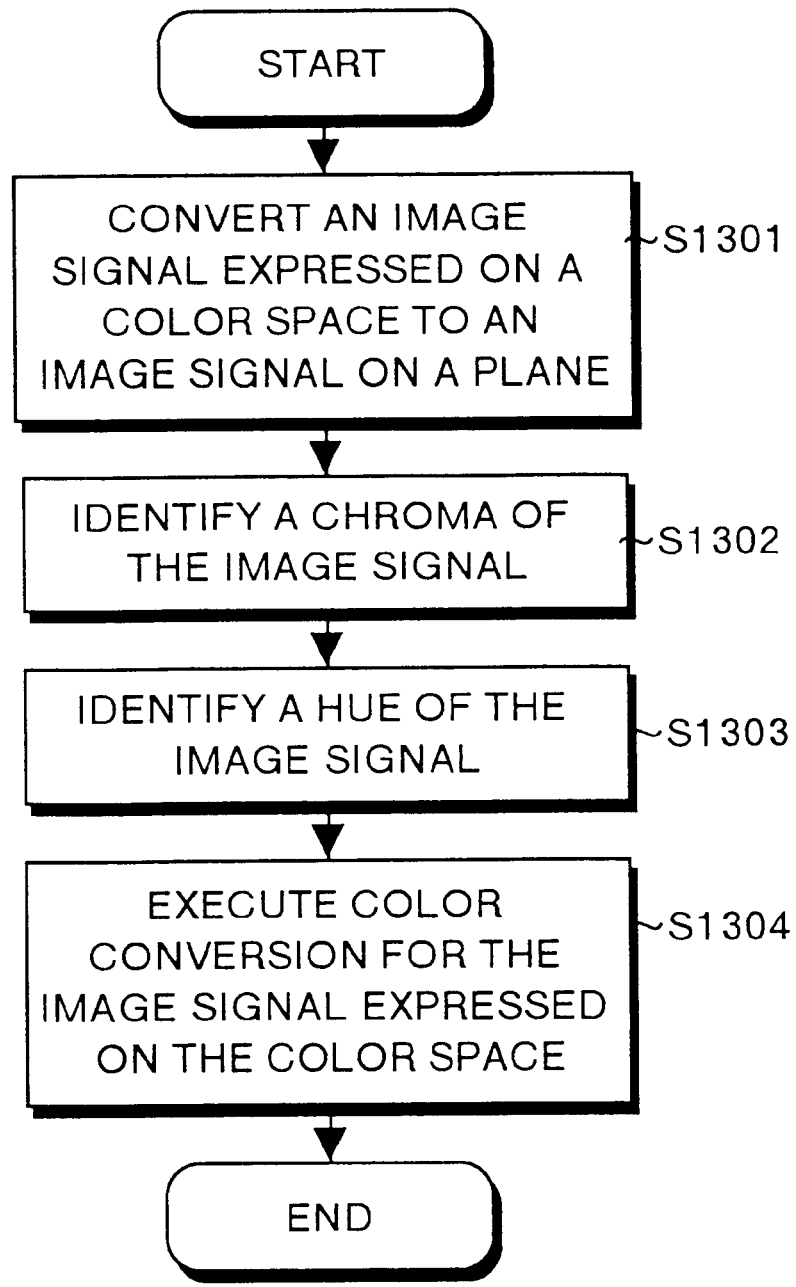
FIG. 13 is a flow chart showing a series of processing executed by the image processing apparatus according to the second embodiment.

Contents of a series of processing by the image processing apparatus according to the second embodiment is explained below. FIG. 13 is a flow chart showing a series of processing sequence executed by the image processing apparatus according to the second embodiment. In the flow chart in FIG. 13, an image signal expressed on a color space is converted to an image signal on a plane (step S1301).

Based on the image signal converted at step S1301, a chroma of the image signal is identified (step S1302). Similarly, based on the image signal converted at step S1301, a hue of the image signal is identified (step S1303).

Based on information (signal) concerning the chroma identified at step S1302 and information (signal) of the hue identified at step S1303, processing for color conversion is executed, and the processing sequence is finished.

Figure 14:
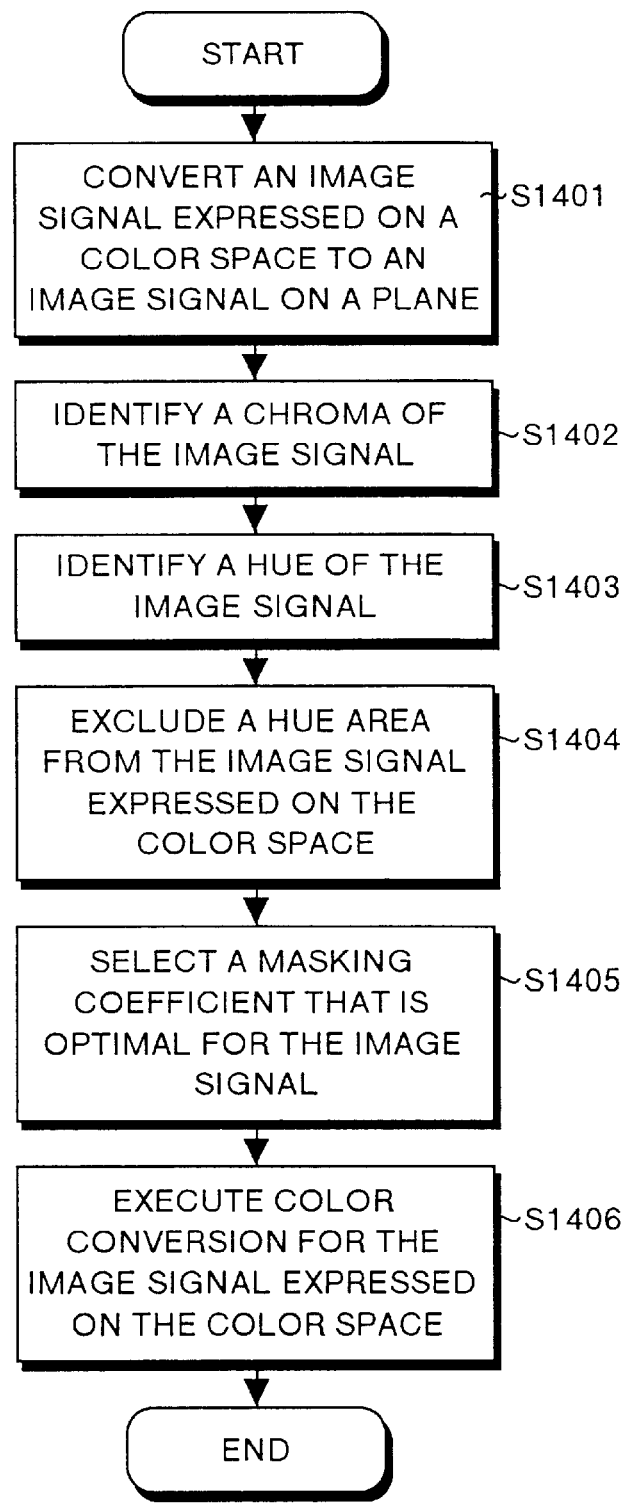
FIG. 14 is a flow chart showing another series of processing executed by the image processing apparatus according to the second embodiment.

FIG. 14 is a flow chart showing a different series of processing executed by the image processing apparatus according to the second embodiment. In the flow chart shown in FIG. 14, at first an image signal expressed on a color space is converted to an image signal on a plane (step S1401).

Based on the image signal converted at step S1401, then a chroma for the image signal is identified (step S1402) Similarly, based on the image signal converted at step S1401, a hue for the image signal is identified (step S1403).

At the next step, a hue area is excluded from the image signal expressed on the color space (step S1404). Based on information (signal) concerning the chroma identified at step S1402 and information (signal) concerning the hue identified at step S1403, a masking coefficient optimal to the image signal is selected (step S1405).

At the next step, based on the result of selection at step S1405, processing for color conversion is executed for the image signal expressed on the color space (step S1406), and then the processing sequence is finished.

As described above, with the image processing apparatus according to the second embodiment of the present invention, a chroma and a hue area are identified, and an optimal masking coefficient are selected based on the identified chroma and hue area to execute color conversion, so that color conversion as desired by the operator can be executed. Further, as the chroma and hue area are decided after the image signal on a color space is converted to a plane signal, a scale of a circuit used for color conversion can be made smaller.

In the third embodiment, image adjustment suited to characteristics of a printer is executed by changing a chroma of an input image signal to a desired one with a chroma conversion section and without changing the hue. Namely, an image is generated by freely changing a chroma for image data input from such as device as a scanner having specific characteristics so that the chroma will match characteristics of a printer.

Figure 15:
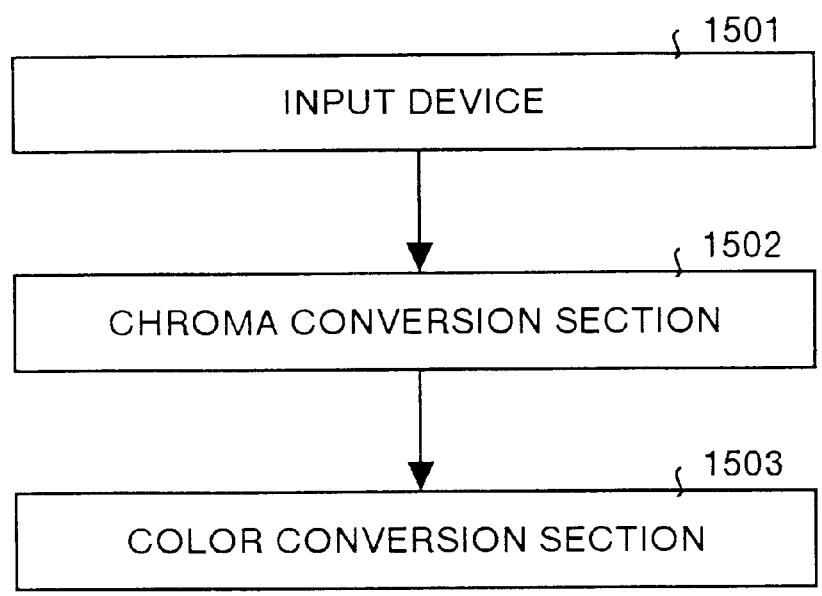
FIG. 15 shows outline of image processing in a third embodiment of the present invention.

FIG. 15 shows outline of the image processing in the third embodiment of the present invention. In FIG. 15, input device 1501 is an image input device such as a scanner, and outputs, for instance, RGB data. Signal output by the input device 1501 are input signal into the chroma conversion section 1502.

The chroma conversion section 1502 change only the chroma without changing a state of a hue or other factor expressed on a color space, and R', G', and B' are output on a color signal based on a signal from the input device 1501. The color conversion section 1503 executes color conversion based on the signals.

Figure 16:
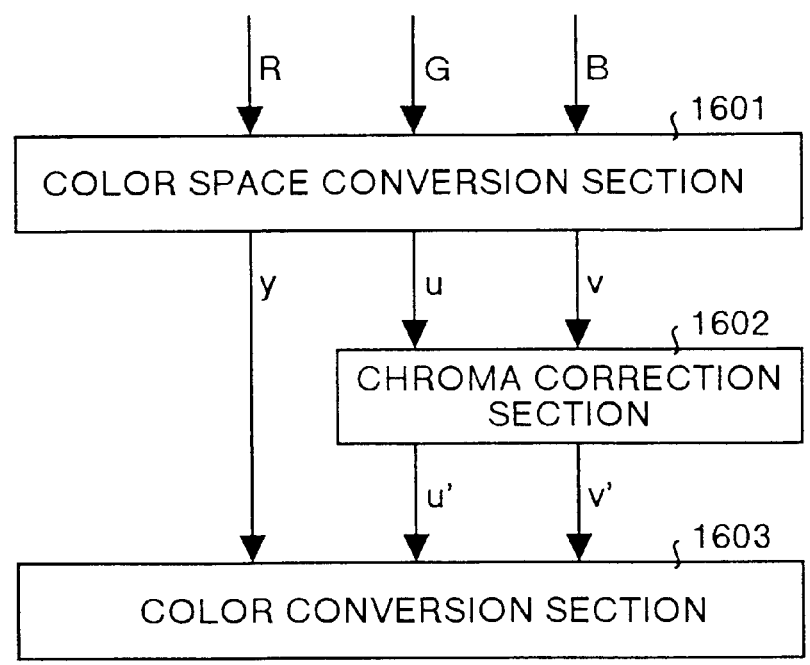
FIG. 16 shows more detailed contents of the image processing in the third embodiment.

The chroma conversion section 1502 is explained in more detail. FIG. 16 shows detailed contents of image processing in the third embodiment. As shown in FIG. 16, a signal from the input device 1501, for instance RGB data is input into a color space conversion section 1601. The color space conversion section 1601 converts a color space signal expressed by RGB data based on the input signal to a color space.

When the color conversion section converts into the color space, assuming that a color space in which R, G, B data is converted is yuv, conversion is executed so that, on the planes u and v formed by two of the three color space signals converted in the color space conversion section 1601, a distance from the origin will be a chroma expressed on the color space. The planes u, v are hue planes. Conversion to another color space is executed based on the remaining one signal to express the brightness y when the planes u, v are converted to hue planes.

Only the chroma is corrected in a chroma correction section 1602 based on the u and v signals converted to color plane signals as input signals. In this correction, a distance from the origin expressed by the u and v signals is obtained. The chroma can be changed according to a value of the chroma. For instance, the chroma value is corrected by weighting data close to an achromatic color at a short distance from the origin, or the chroma value is made smaller in an image signal with large chroma data. The correction method can be selected according to characteristics of s scanner or printer, or according to an operator's intention.

Correction of a chroma is carried out through the following equations:

$$u'=au \qquad (1)$$

$$v'=va \qquad (2)$$

(where a is some value)

When the u' and v' are converted through the equations (1) and (2) above, the correction is always carried out with the same ratio. On the u and v planes, only a distance from the origin is changed, and a direction vector is not changed. With this operation, only the chroma can be corrected without changing the hue. Based on the data corrected as described above, color conversion suited to an output device such as a printer can be executed with the color conversion section 1603.

Figure 17:
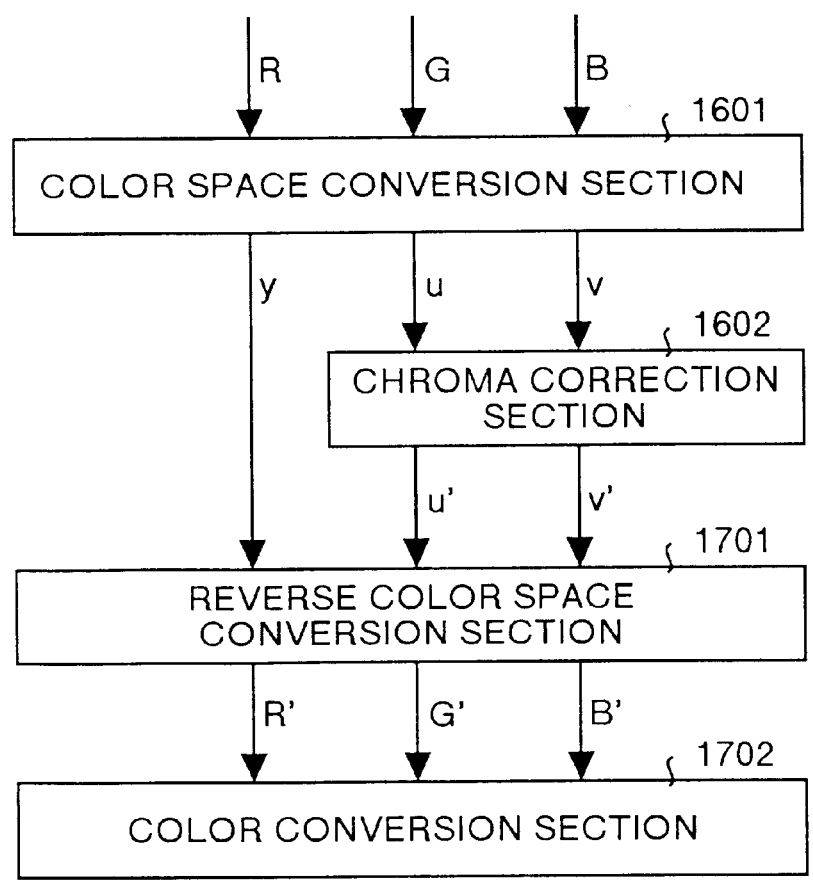
FIG. 17 shows other contents of the image processing in the third embodiment.
Figure 18:
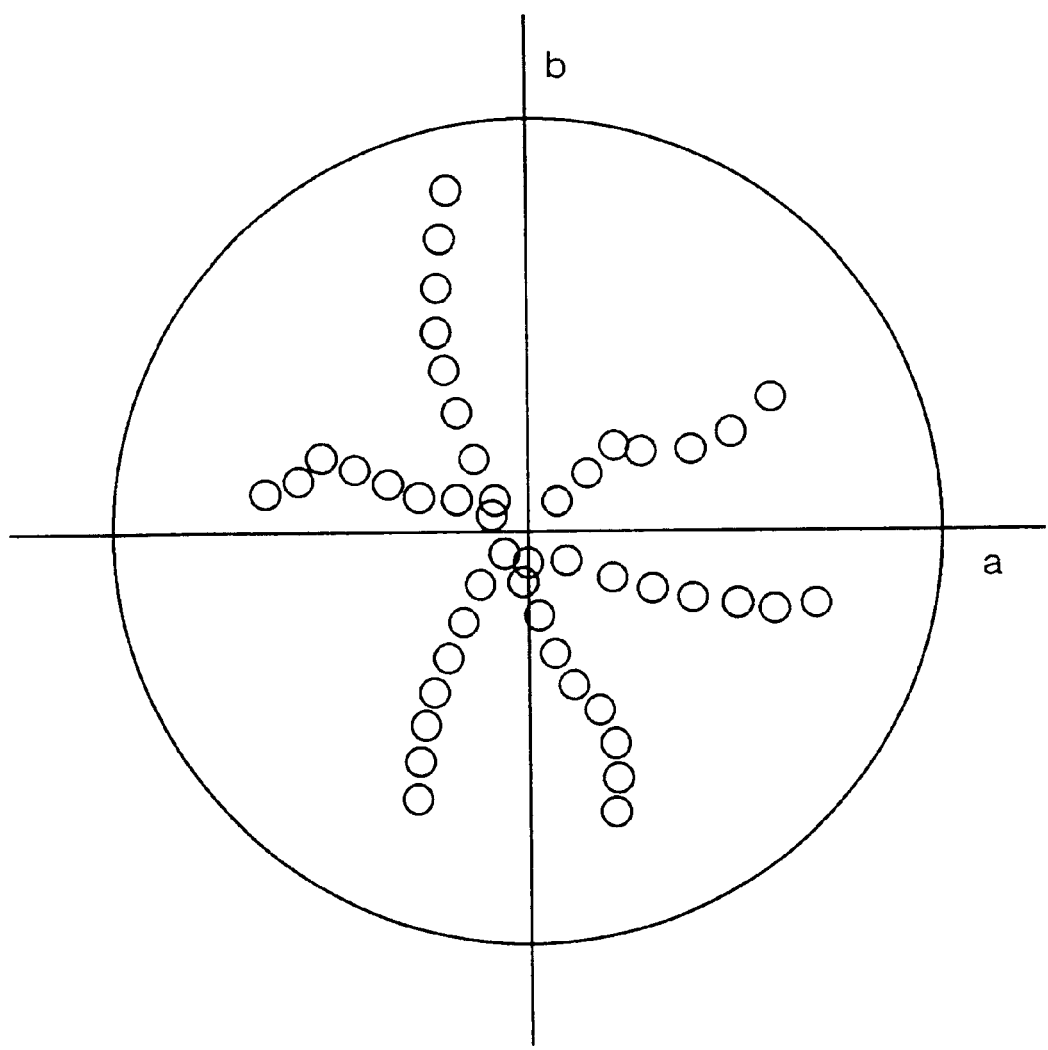
FIG. 18 shows the color conversion characteristics.

When the color conversion section uses a color space based on image data obtained with an input device such as a scanner, the corrected color space yu' v' planes are once reversely converted to the same space as that expressed by image data obtained with the input device by a reverse color space conversion section 1701, and then the processing for color conversion is executed by the color conversion section 1702. The relation is as shown in FIG. 17. By returning a space as the original one, for instance, when an input signal, which is a scanner signal, is an RGB signal, a chroma of the image can easily be corrected.

The color image processing method and image processing method described in this embodiment is realized by executing a program previously prepared with a personal computer or a work station. The program is recorded in a computer-readable medium such as a hard disk, a floppy disk, a CD-ROM, an MO, or a DVD, and is executed after reading out from the recording medium using a computer. The program can be distributed via the recording medium, or through a network such as Internet.

As described above, in the present invention, the plane signal conversion unit converts a color space expressed by an input color image signal to a plane to generated a plane signal; the chroma identification unit identifies a chroma of the color image signal based on the plane signal generated by the plane signal conversion unit to generate a chroma identification signal; a hue identification unit identifies a hue area in the color image signal based on the plane signal generated by the plane signal conversion unit to generate a hue area identification signal; and the color conversion unit executes color conversion for the image signal based on the chroma identification signal generated by the chroma identification unit and the hue area identification signal generated by the hue area identification unit, so that a particular color even in an image in which a chroma varies can be converted to another specified color. Therefore, there is provided the advantage that it is possible to provide a color image processing unit which can change a particular color to another color as intended by the operator.

In the present invention, the color conversion instruction unit instructs conversion from a color specified by an operator to another specified color; the color conversion unit executes color conversion for the color image signal based on the other specified color, so that a color even in an image in which a chroma varies can be converted to another color according to an operator's intention. Therefore, there is provided the advantage that it is possible to provide a color image processing unit which can change a particular color to another color as intended by the operator.

In the present invention, the masking coefficient computing unit computes masking coefficients for a plurality of hue areas; the masking coefficient selection unit selects a masking coefficient among the masking coefficients computed by the masking coefficient computing unit based on the chroma identification signal generated by the chroma identification unit and the hue area identification signal generated by the hue area identification unit; and the color conversion unit executes color conversion for the color image signal using the masking coefficient selected by the masking coefficient selection unit, so that an optical masking coefficient for color conversion can be selected. Therefore, there is provided the advantage that it is possible to provide a color image processing unit which can change a particular color to another color as intended by the operator.

In the present invention, the hue area selection unit selects a hue area in the color image signal based on other specified color instructed by the color conversion instruction unit, so that an optical masking coefficient for color conversion can be selected. Therefore, there is provided the advantage that it is possible to provide a color image processing unit which can change a particular color to another color as intended by the operator.

In the present invention, the plane signal conversion unit converts an image signal expressed on a color space to an image signal on a plane; the chroma identification unit identifies a chroma of the image signal based on the image signal converted by the plane signal conversion unit; a hue area identification signal identifies a hue of the image signal based on the image signal converted by the plane signal conversion unit; and the color conversion unit executes color conversion for an image signal expressed on the color space based on a signal input from the chroma identification unit and a signal input from the hue area identification unit, so that, even when an image signal is input using an input device having different characteristics in image processing, a particular color is converted to other specified color according to characteristics of the input device and then the image signal can be output with such as device as a printer. Therefore, there is provided the advantage that it is possible to provide a color image processing unit which can change a particular color to another color as intended by the operator.

In the present invention, the plane signal conversion unit converts an image signal expressed on a color space to an image signal on a plane; the chroma identification unit identifies a chroma of the image signal based on the image signal converted by the plane signal conversion unit; the hue area identification unit identifies a hue of the image signal based on the image signal converted by the plane signal conversion unit; the masking coefficient selection unit selects a masking coefficient optimal for the image signal based on a signal input from the chroma identification unit and a signal input from the hue area identification unit; and the color conversion unit executes color conversion for an image signal expressed on the color space based on the result of selection by the masking coefficient selection unit, so that a masking coefficient optimal for an input image signal can be selected in color conversion processing. Therefore, there is provided the advantage that it is possible to provide a color image processing unit which can change a particular color to another color as intended by the operator.

In the present invention, the masking coefficient selection unit selects a masking coefficient excluding a hue area from the image signal expressed on the color space, so that a masking coefficient suited to an input image signal can be selected in the color conversion processing, and also the color conversion processing can be executed after a hue is divided and the masking processing is executed. Therefore, there is provided the advantage that it is possible to provide a color image processing unit which can change a particular color to another color as intended by the operator.

In the present invention, the operation unit makes it possible for an operator to input an instruction for converting a color specified in an image signal expressed on the color space to another color, so that the operator can easily specify a particular color to be converted. Therefore, there is provided the advantage that it is possible to provide a color image processing unit which can change a particular color to another color as intended by the operator.

In the present invention, in the plane signal conversion step, a color space expressed by an input color image signal is converted to a plane to generate a plane signal; in the chroma identification step, a chroma of the color image signal is identified based on the plane signal generated in the plane signal conversion step to generate a chroma identification signal; in the hue area identification step, a hue area in the color image signal is identified based on the plane signal generated in the plane signal conversion step to generate a hue area identification signal; and in the color conversion step, color conversion for the color image signal is executed based on the chroma identification signal generated in the chroma identification step and the hue area identification signal generated in the hue area identification step, so that a particular color even in a color image in which a chroma varies can easily be changed to another color. Therefore, there is provided the advantage that it is possible to provide a color image processing method which can change a particular color to another color as intended by the operator.

In the present invention, in the color conversion instruction step, conversion from a color specified by an operator to another specified color is instructed; in the color conversion step, color conversion is executed based on the other specified color, so that a particular color even in a color image in which a chroma varies can easily be changed to another color. Therefore, there is provided the advantage that it is possible to provide a color image processing method which can change a particular color to another color as intended by the operator.

In the present invention, in the masking coefficient computing step, masking coefficients for a plurality of hue areas are computed; in the masking coefficient selection step, a masking coefficient is selected from those computed in the masking coefficient computing step based on the chroma identification signal generated in the chroma identification step and the hue area identification signal generated in the hue area identification step; in the color conversion step, color conversion for the color image signal is executed using the masking coefficient selected in the masking coefficient selection step, so that an optimal masking coefficient can be selected for color conversion. Therefore, there is provided the advantage that it is possible to provide a color image processing method which can change a particular color to another color as intended by the operator.

In the present invention, in the hue area selection step, a hue area in the color image signal is selected based on the other specified color to which a particular color is instructed to be converted in the color conversion instruction step, so that an optimal masking coefficient can be selected when color conversion is performed according to specification of a color by an operator. Therefore, there is provided the advantage that it is possible to provide a color image processing method which can change a particular color to another color as intended by the operator.

In the present invention, in the plane signal conversion step, an image signal expressed on a color space is converted to an image signal on a plane; in the chroma identification step, a chroma of the image signal is identified based on the image signal converted in the plane signal conversion step; in the hue area identification step, a hue of the image signal is identified based on the image signal converted at the plane signal conversion step; and in the color conversion step, color conversion for an image signal expressed on the color space is executed based on the signal identified at the chroma identification step and the signal identified at the hue area identification step, so that, even when an image signal is input with an input device such as a scanner having different characteristics, the color conversion processing for converting a particular color to another particular color is executed according to characteristics of the input device, and then the image signal can be output with such a device as a printer. Therefore, there is provided the advantage that it is possible to provide a color image processing method which can change a particular color to another color as intended by the operator.

In the present invention, in the plane signal conversion step, a color signal expressed on a color signal is converted to an image signal on a plane; in the chroma identification step, a chroma of the image signal is identified based on the image signal converted in the plane signal conversion step; in the hue area identification step, a hue of the image signal is identified based on the image signal converted in the plane signal conversion step; in the masking coefficient selection step, a masking coefficient optimal for the image signal is selected based on the signal identified in the chroma identification step and the signal identified in the hue area identification step; and in the color conversion step, color conversion for the image signal expressed on the color space is executed based on the result of selection in the masking coefficient selection step, so that a masking coefficient suited to an input image signal can be selected. Therefore, there is provided the advantage that it is possible to provide a color image processing method which can change a particular color to another color as intended by the operator.

In the present invention, in the masking coefficient selection step, a masking coefficient is selected excluding a hue area from an image signal expressed on the color space, so that a masking coefficient suited to an input image signal can be selected in the color conversion processing, and the color conversion processing can be executed after a hue is divided and the masking processing is executed. Therefore, there is provided the advantage that it is possible to provide a color image processing method which can change a particular color to another color as intended by the operator.

In the present invention, a program for making a computer execute any of the methods described above is recorded, so that the program can be read out for execution using a reading device. Therefore, there is provided the advantage that it is possible to obtain a recording medium enabling realization of the operations as described above with a computer.

The present document incorporated by reference the entire contents of Japanese priority documents, 11-020573 filed in Japan on Jan. 28, 1999 and 11-153088 filed in Japan on May 31, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
   a plane signal conversion unit which converts an image signal expressed on a color space to an image signal on a plane;
   a chroma identification unit which identifies a chroma of the image signal based on the image signal converted by said plane signal conversion unit;
   a hue area identification unit which identifies a hue of the image signal based on the image signal converted by said plane signal conversion unit;
   a masking coefficient selection unit which selects an optimal masking coefficient for the image signal based on a signal input from said chroma identification unit and a signal input from said hue area identification unit; and
   a color conversion unit which executes color conversion of the image signal expressed on the color space based on a result of selection by said masking coefficient selection unit;
   wherein said masking coefficient selection unit selects a masking coefficient excluding a hue area from the image signal expressed on the color space.

2. An image processing method comprising:
   a plane signal conversion step at which an image signal expressed on a color space is converted to an image signal on a plane;

a chroma identification step at which a chroma of the image signal is identified based on the image signal converted at the plane signal conversion step;

a hue area identification step at which a hue of the image signal is identified based on the image signal converted at the plane signal conversion step;

a masking coefficient selection step at which a masking coefficient optimal to an image based on the signal identified at the chroma identification step and a signal identified at the hue area identification step; and a color conversion step at which color conversion of the image signal expressed on the color space is executed based on the result of selection at the masking coefficient selection step;

wherein a masking coefficient is selected excluding a hue area from the image signal expressed on the color space at the masking coefficient selection step.

* * * * *